Sept. 1, 1931.  G. A. DOUGHTY ET AL  1,821,054
BALANCED GATE VALVE
Filed May 3, 1930
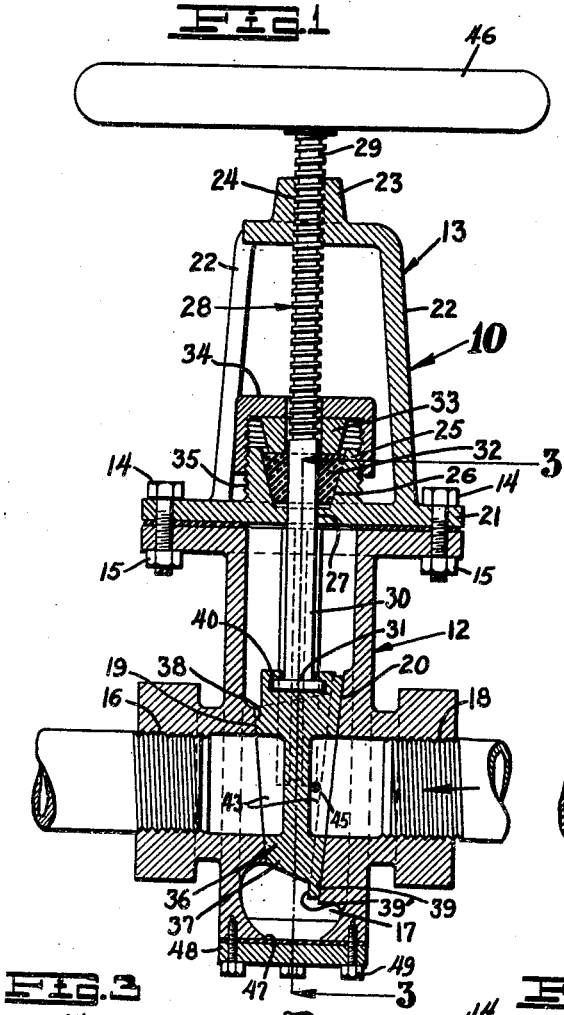
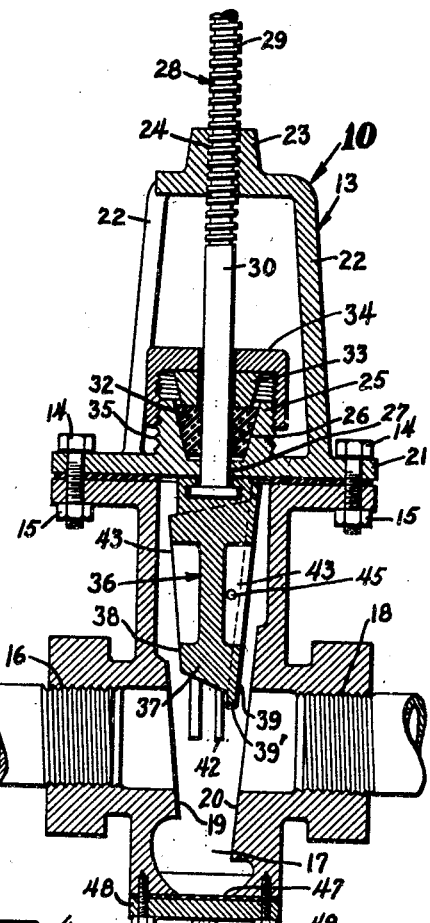
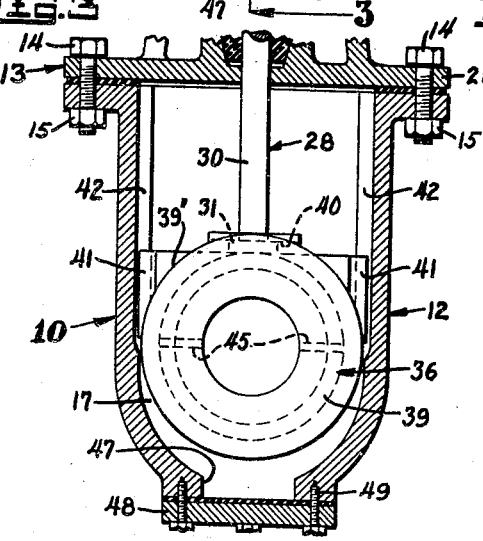
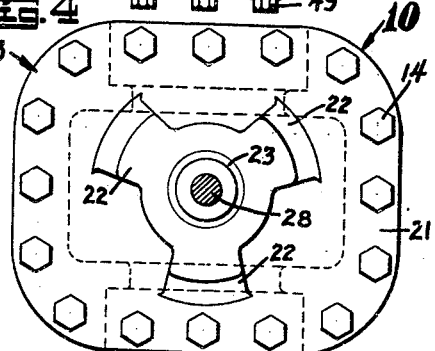
INVENTORS.
G. A. DOUGHTY.
H. A. JOHNSTON.
BY B. J. Craig
ATTORNEY.

Patented Sept. 1, 1931

1,821,054

UNITED STATES PATENT OFFICE

GLENN A. DOUGHTY AND HERBERT A. JOHNSTON, OF ANAHEIM, CALIFORNIA

BALANCED GATE VALVE

Application filed May 3, 1930. Serial No. 449,438.

This invention relates to improvements in valves.

The general object of the invention is to provide an improved valve wherein the fluid pressure on the closure member is equalized.

Another object of the invention is to provide a valve including inlet and outlet seats of different areas whereby the fluid pressure on the inlet side of the closure member is balanced by fluid pressure exerted on the surface of the closure, the area of which equals the area of the closure exposed to pressure on the inlet side of the valve.

Other objects and advantages of this invention will be apparent from the following description taken in connection with the accompanying drawings wherein:

Fig. 1 is a central vertical section through a valve embodying the features of our invention and showing the valve in a closed position.

Fig. 2 is a similar view showing the valve in an opened position.

Fig. 3 is a section taken on line 3—3 of Fig. 1 with the closure member and stem shown in elevation, and Fig. 4 is a top plan view of the valve.

Referring to the drawings by reference characters we have indicated our improved valve generally at 10. As shown this valve comprises a body portion 12 having a cap 13 secured thereto by bolts 14 and nuts 15.

The body 12 includes a threaded outlet 16 which communicates through a chamber 17 with an oppositely disposed threaded inlet 18. Surrounding the outlet 16 a seat portion 19 is provided and surrounding the inlet 18 a seat portion 20 is provided. The faces of the seat portions 19 and 20 are arranged in planes converging at their lower portions.

The cap 13 includes a base 21 having a plurality of legs 22 thereon which terminate in a boss 23 having a threaded aperture 24 therein. Integral with the boss 21 there is provided a boss 25 which includes a conically shaped recess 26 and extending from the recess through the remainder of the boss an aperture 27 is provided.

Positioned in the aperture 27 of the cap we provide a stem 28 which includes a threaded portion 29 positioned in the threaded aperture 24 of the boss 23 and an unthreaded portion 30 which terminates in an enlarged head 31.

Positioned in the conical recess 26 of the boss 25 and surrounding the stem 28 a packing member 32 is provided which is adapted to be forced into the recess by a conically shaped collar 33 which surrounds the stem 28 and is in turn forced into engagement with the packing member by a cap nut 34 which surrounds the stem and engages threads 35 provided on the exterior of the boss 25.

For regulating the passageway from the inlet to the outlet we provide a closure member indicated generally at 36. As shown this closure member includes a body portion 37, the opposed faces of which form seat engaging portions 38 and 39 which are shaped to conform to the inclination of the outlet seat 19 and the inlet seat 20. On the top of the body 37 there is provided an undercut slot 40 in which the head 31 of the stem 28 is positioned and on each side of the body there is provided a tongue 41 which is adapted to be positioned between guides 42 on the valve body 12.

The seat 20 is larger in diameter than the seat 19 and the seat engaging portion 39 of the closure has a portion formed by a flange 39' which extends beyond the body thereof, thus making the seat engaging portion 39 larger than the seat engaging portion 38.

In each face of the body 37 of the closure member 36 we provide a recess 43 and extending from the recess 43 on the inlet side of the closure member through the body thereof we provide a plurality of spaced apertures 45 which afford communication between the inlet and the chamber 17 when the closure member 36 is in closed position.

For rotating the stem 28 to raise or lower the closure member 36 we have shown a hand wheel 46 secured to the stem above the cap 13, but it will be understood that the stem may be rotated by an electric motor or in any other suitable manner.

For cleaning the chamber 17 of sediment which might collect therein we provide an aperture 47 in the bottom of the valve body 12 which is adapted to be closed by a plate 48 secured to the valve body by a plurality of bolts 49.

When the device 10 is operatively interposed in a pipe line containing fluid under pressure flowing in the direction of the arrow (Fig. 1) and the closure member 36 is moved to a closed position as shown in Fig. 1, the fluid passes through the apertures 45 of the closure member into the chamber 17. The area of the seating portion of the closure at the outlet end is less than the area of the inlet seating portion by an amount which equals the area of the part of the closure member 36 which is exposed to the fluid pressure from the inlet, whereupon the pressure of the fluid adjacent the closure member in the chamber 17 approximately equals the pressure of the fluid against the inlet side of the closure member, thereby balancing the fluid pressure on the two sides of the closure member.

It will thus be apparent that no matter how great the pressure against the inlet side of the closure member, very little effort is required to "crack" the closure member and move it to an opened position as shown in Fig. 2.

By providing the recesses 43 in the body portion 37 of the closure member and having the apertures 45 opening into the chamber 17 on the pressure side, the apertures 45 are not against the seat portion 20, thereby eliminating any danger of the edges of the apertures scraping the seat portion and becoming clogged.

The same balancing effect may be obtained without departing from the spirit of our invention, by having both the inlet and outlet seat portions of the valve the same area and making the seating surface of the closure member outlet seat of less area than the seating surface of the closure member inlet seat.

It will also be apparent that the chamber 17 may be readily cleaned out while the valve is in service by moving the closure member 36 to a closed position and removing the plate 48.

From the foregoing description it will be apparent that we have provided a novel balanced valve structure which is simple in construction and highly efficient in use.

Having thus described our invention, we claim:

1. In a valve a body having an inlet and an outlet, a valve seat surrounding said inlet, a second valve seat surrounding said outlet, the area of said first valve seat exceeding the area of the second valve seat by an amount substantially equal to the area of said inlet.

2. In a valve a body having an inlet and an outlet, a valve seat surrounding said inlet, a second valve seat surrounding said outlet, a closure member having faces engaging said first valve seat and said second valve seat, the area of the engaging faces at the first valve seat exceeding the area of the engaging faces at the second valve seat by an amount substantially equal to the area of said inlet.

3. In a valve device, a body having a chamber and having an inlet and an outlet leading to said chamber, an inlet valve seat and an outlet valve seat therein, a reciprocable valve member movable towards and from said valve seats, said inlet valve seat being of greater area than said outlet valve seat, said member having a conduit to direct fluid from said inlet side through said valve member to said chamber to produce balanced pressure on opposite faces of said valve.

4. In a valve device, a body having an inlet opening therein, a valve seat surrounding said opening, a valve member movable toward and from said valve seat, said valve member including a surface surrounding said valve seat and means to direct fluid from said opening to said surface whereby the fluid pressure on said surface counteracts the fluid pressure on said valve member at said opening.

5. A valve including a body portion having a chamber, an inlet to said chamber and an outlet from said chamber, a seat portion surrounding said inlet and a seat portion surrounding said outlet, one of said seats being of greater area than the other seat, a closure member positioned in said valve body chamber and having opposed seat portions adapted to engage said inlet and outlet seat portions, there being an aperture in said closure member extending from said inlet side opening into said chamber.

6. In a valve including a chamber, an inlet and an outlet, seat portions surrounding said inlet and said outlet, a closure member positioned in said chamber, opposed seat portions on said closure member adapted to engage said inlet and outlet seat portions, means for the introduction of fluid pressure into said chamber, there being a sufficient difference in the area of said inlet and said outlet seat engaging surfaces whereby the pressure of fluid introduced into said chamber balances the fluid pressure on the inlet side of said closure member.

7. In a valve including an inlet and an outlet, a seat portion surrounding said inlet and said outlet, a closure member positioned between said inlet and outlet seat portions, opposed seat portions on said closure member adapted to engage said inlet and outlet seat portions, means to direct fluid from the inlet side to the exterior of said closure member, there being a difference in the area of said inlet and outlet seat engaging surfaces whereby fluid directed to the exterior of said closure member approximately balances the fluid pressure on the inlet side of said closure member.

8. A valve including a body portion having a chamber, an inlet to said chamber and an outlet from said chamber, a seat portion surrounding said inlet and a seat portion surrounding said outlet, said seat portions being inclined with their lowermost extremities converging, said inlet seat being of greater area than said outlet seat, a closure member positioned in said valve body member and having opposed annular seat portions adapted to engage said inlet and outlet seat portions and shaped to conform to the inclination of said inlet and outlet seat portions, there being a recess in each face of said closure member and said closure member having a plurality of apertures extending from said recess on the pressure side of said closure member to the exterior of said closure member and means to guide said closure member.

9. A valve, said valve including a body portion, a chamber in said body, an inlet to said chamber and an outlet from said chamber, a seat portion surrounding said inlet and a seat portion surrounding said outlet, said seat portions being inclined, said inlet seat being of greater area than said outlet seat, a closure member positioned in said valve body chamber, opposed annular seat portions on said closure member adapted to engage said inlet and outlet seat portions and being shaped to conform to the inclination of said inlet and outlet seat portions, said inlet seat portion of said closure being of greater area than said outlet seat portion, there being a recess in each face of said closure member; a plurality of apertures in said closure member, said apertures extending from the pressure side of said closure member through said closure and opening into said chamber.

10. A valve including a body portion having a chamber and having an inlet to said chamber and an outlet from said chamber, a seat portion surrounding said inlet and a seat portion surrounding said outlet, said seat portions being inclined with their lowermost extremities converging, said inlet seat being of greater area than said outlet seat, a cap including a body, a plurality of legs on said cap body, said legs terminating in a boss having a threaded aperture, a neck on said cap body having a conically shaped aperture, there being an aperture in said cap body communicating with said neck aperture and coaxial with said threaded aperture in said boss, a stem, said stem including a threaded portion positioned in said threaded aperture of said cap boss and an unthreaded portion positioned in said cap body aperture and terminating in an enlarged annular head, a resilient conically shaped packing member surrounding said stem and positioned in said cap body aperture, a compressing member surrounding said stem above said packing member, a threaded nut surrounding said stem, said cap neck having threads on the exterior thereof and said nut being adapted to engage said neck threads, a closure member positioned in said valve body chamber and having opposed annular seat portions adapted to engage said inlet and outlet seat portions and being shaped to conform to the inclination of said body seat portions, there being an aperture in said closure member extending from said inlet side and opening into said chamber and means to connect said stem to said closure member.

11. A valve including a body portion having a chamber, an inlet to said chamber and an outlet from said chamber, a seat portion surrounding said inlet and a seat portion surrounding said outlet, said seat portions being inclined with their lowermost extremities converging, said inlet seat being of greater area than said outlet seat, a cap including a body portion, a plurality of legs on said cap body, said legs terminating in a boss, there being a threaded aperture in said boss, a neck on said cap body, there being an aperture in said neck and an aperture in said cap body communicating with said neck aperture and coaxial with said threaded aperture in said boss, a stem, said stem including a threaded portion positioned in said threaded aperture of said cap boss and an unthreaded portion positioned in said cap body aperture and terminating in an enlarged annular head, a packing member surrounding said stem and positioned in said aperture, means to hold said packing member in place, a closure member positioned in said valve body member and having opposed annular seat portions adapted to engage said inlet and outlet seat portions, there being a recess in each face of said closure member and said closure member having a plurality of apertures extending from said recess on the pressure side of said closure member to the exterior of said closure member, a tongue on each side of said closure member and guide channels on said valve body, said tongues being movable in said guide channels, there being an undercut groove in said closure member and said stem head being positioned in said undercut groove.

12. A valve, said valve including a body portion and a cap removably secured to said body, there being a chamber in said body and an inlet to said chamber and an outlet from said chamber, a seat portion surrounding said inlet and a seat portion surrounding said outlet, said seat portions being inclined with their lowermost extremities converging, said inlet seat portion being of greater area than said outlet seat portion, the bottom of said body having an aperture communicating with said chamber, a plate removably secured to said body and closing said aperture, said cap including a body portion, a plurality of legs on said cap body, said legs terminating in a boss, there being a threaded aperture in said boss, a neck on said cap body, there being a conically shaped recess in said neck and an aperture in said cap body communicating with said recess and coaxial with said threaded aperture in said boss, a stem, said stem including a threaded portion positioned in said threaded aperture of said cap boss and an unthreaded portion positioned in said cap body aperture and terminating in an enlarged annular head, a resilient conically shaped packing member surrounding said stem and positioned in said conical aperture, a compressing member surrounding said stem above said packing member, a threaded nut surrounding said stem, said cap neck having threads on the exterior thereof and said nut being adapted to engage said neck threads, a closure member positioned in said valve body chamber and having opposed annular seat portions adapted to engage said inlet and outlet seat portions and shaped to conform to the inclination of said inlet and outlet seat portions, there being a recess in each face of said closure member and said inlet seat portion of said closure member being of greater area than said outlet seat portion, said closure member having a plurality of apertures extending from said recess on the pressure side of said closure member to the exterior of said closure member, a tongue on each side of said closure member and guide channels on said valve body, said tongues being movable in said guide channels, said closure member having an undercut groove with said stem head positioned in said undercut groove.

In testimony whereof, we hereunto affix our signatures.

GLENN A. DOUGHTY.
HERBERT A. JOHNSTON.